United States Patent
Yata

(10) Patent No.: US 7,590,343 B2
(45) Date of Patent: Sep. 15, 2009

(54) AUTOFOCUS SYSTEM

(75) Inventor: Kunio Yata, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 467 days.

(21) Appl. No.: 11/373,282

(22) Filed: Mar. 13, 2006

(65) Prior Publication Data

US 2006/0210260 A1    Sep. 21, 2006

(30) Foreign Application Priority Data

Mar. 15, 2005 (JP) ............... 2005-073361

(51) Int. Cl.
  G03B 13/30 (2006.01)
  G03B 17/18 (2006.01)
  H04N 5/232 (2006.01)
(52) U.S. Cl. .............. 396/147; 396/124; 396/150; 348/346
(58) Field of Classification Search ........... 396/147, 396/79, 80, 82, 89, 93, 102–104, 121, 124, 396/150; 348/208.12, 345, 346
  See application file for complete search history.

(56) References Cited

U.S. PATENT DOCUMENTS

2004/0004670 A1* 1/2004 Yamashita ............... 348/345

FOREIGN PATENT DOCUMENTS

JP    2002-365519 A    12/2002
WO    WO-02/099496 A1  12/2002

* cited by examiner

Primary Examiner—Rochelle-Ann J Blackman
(74) Attorney, Agent, or Firm—Birch, Stewart, Kolasch and Birch, LLP

(57) ABSTRACT

An autofocus system includes: an imaging device which captures a subject image; a matching image detection device which detects an image that most matches a stored reference pattern image of a target subject to focus on; a determining device that determines that an image of the target subject was detected when a correlation value indicating a degree of matching of the detected image with respect to the reference pattern image is equal to or greater than a predetermined threshold value and determines that an image of the target subject was not detected when the correlation value is less than the threshold value; a changing device which changes the threshold value; and an autofocus device which, only when an image of the target subject was detected, takes a position of the detected image as a position of the target subject to focus on and performs focus adjustment.

8 Claims, 4 Drawing Sheets

AUTOFOCUS SYSTEM

BACKGROUND OF THE INVENTION

1. Field of the Invention

The present invention relates to an autofocus system, and more particularly to an autofocus system comprising an automatic tracking function that tracks a desired target subject as a focus object on a camera screen showing captured images.

2. Description of the Related Art

In imaging systems such as television cameras that convert images of a subject from an image pickup device (CCD or the like) into electrical signals (image signals), a contrast system is generally employed as an autofocus (hereunder, abbreviated as "AF") system. A contrast system is a system which detects the contrast of a subject image from image signals that were captured by an image pickup device to automatically perform focusing to achieve the optimal focus state by controlling the focus of the taking lens such that the highest contrast is achieved.

In most AF employing a contrast system, the entire subject within the imaging region of the camera is not taken as the AF object, and instead only the subject within a region of one part of the imaging region is taken as the object. In AF according to a contrast system, image signals of the region taken as the AF object are extracted from the image signals incorporated from the entire imaging area of the image pickup device, and by controlling the focus such that the contrast of the extracted image signals of that region becomes the highest, the AF object is limited to only the subject of one part of the region. In the present specification, the region of a subject taken as the AF object among the imaging region of a camera or an image region of the subject taken as the AF object on a camera screen showing captured images is referred to as an "AF area", and a frame showing the contours of that AF area is referred to as an "AF frame".

Although, conventionally, when a single AF area is set after being fixed to a predetermined position on a screen showing captured images a rectangular AF area is normally set in the center of the screen, a device is also known that allows the position of the AF area to be changed by an operation of an operator (for example, see Japanese Patent Application Laid-Open No. 2002-365519).

SUMMARY OF THE INVENTION

However, in a case where the AF area can be changed to a desired position, when the target subject which the operator wishes to focus on is an object that moves on the screen it is necessary for the operator to move the position of the AF area to match the movement of that target subject by operating an operating device such as a track ball or a joystick. A problem thus exists in that the operation requires the labor and attention of the operator.

Thus, a method in which the AF area automatically tracks a moving target subject is effective because the labor of the operator to adjust the location of the AF area is no longer required. For example, a so-called pattern matching technology is known as a method that detects a specific reference pattern image within a source image. By applying that technology it is possible to detect an image of a specific target subject within a captured image, and it is possible to have the AF area track the target subject by moving the AF area to the position of the detected target subject.

However, when the image of a target subject on a screen showing captured images is changed significantly, the risk that a subject other than the target subject will be erroneously detected as the target subject increases significantly. In this case, the unexpected situation occurs that the focus shifts from the original target subject to focus on the erroneously detected subject. Accordingly, when there is a high possibility of erroneous detection the device in question determines that detection of the target subject is not possible (tracking disabled) and that is preferable not to move the AF area.

Meanwhile, in pattern matching, images that are the same size as a reference pattern image are extracted from a source image by changing the regions sequentially, and correlation values are determined with respect to the extracted images and the reference pattern image. The image with the highest correlation value among the images extracted from the respective regions is then detected as the image that most matches the reference pattern image. At this time, when the correlation value that exhibited the highest value is less than a predetermined threshold value the image in question is not determined to be an image that matches the reference pattern image even though the correlation value thereof is the highest value, and the device determines that detection is not possible (no pattern).

Accordingly, it is possible to reduce the possibility of erroneously detecting a target subject by setting a high threshold value to set stringent conditions for determining the existence of a pattern. In this specification, assuming that the degree of matching for determining that an image that matches a reference pattern image was detected (pattern exists) within a source image in pattern matching is referred to as the "pattern matching sensitivity" (or simply "sensitivity"), then setting stringent conditions for determining that a pattern exists, i.e. increasing the aforementioned threshold value, refers to increasing the pattern matching sensitivity.

However, if the pattern matching sensitivity is increased excessively there is a problem that the possibility increases that even when the image with the largest correlation value is the intended target subject, the device will determine that an image that matches the reference pattern image was not detected (no pattern exists). Therefore, although it is desirable to increase the pattern matching sensitivity moderately to avoid erroneous detection of a target subject, the suitable pattern matching sensitivity will differ according to the scene or genre of a program.

The present invention was made in light of the above described circumstances, and an object of this invention is to provide an autofocus system that can adequately prevent erroneous detection of a target subject by an automatic tracking function that automatically tracks a target subject as a focus object by AF on a screen.

In order to achieve the above described object, an autofocus system according to the first aspect of this invention comprises: an imaging device which images a subject image that was formed by an optical system; a matching image detection device which detects an image that most matches a reference pattern image that was previously stored as an image of a target subject to focus on among captured images that were imaged by the imaging device; a determining device that determines that an image of the target subject was detected among the captured images when a correlation value which indicates a degree of matching of an image detected by the matching image detection device with respect to the reference pattern image is equal to or greater than a predetermined threshold value and determines that an image of the target subject was not detected among the captured images when the correlation value is less than the threshold value; a changing device which changes the threshold value in the determining device; and an autofocus device which, only in a case where the determining device determined that an image of the target subject was detected, takes a position, on the screen showing captured images, of an image that was detected by the matching image detection device as a position of the target subject to focus on and performs focus adjustment of the optical system such that a target subject in the position is in focus.

According to the first aspect of this invention, when a correlation value for a reference pattern image and an image detected among captured images as the image that most matches the reference pattern image that was stored as an image of a target subject is equal to or greater than a predetermined threshold value, that image is determined to be an image of the target subject. This invention also makes it possible to change the threshold value. Therefore, according to this invention a suitable threshold value (i.e. sensitivity) can be set in accordance with an imaging situation and erroneous detection of a target subject can be adequately prevented.

An autofocus system of the second aspect of this invention is a system according to the first aspect, wherein the changing device comprises a designating device which designates by a manual operation a value to be set as the threshold value, and a setting device which sets the threshold value to the value designated by the designating device. This aspect of the invention illustrates a case in which an operator changes the threshold value manually.

An autofocus system of the third aspect of this invention is a system according to the first or second aspect, wherein the autofocus device performs focus adjustment based on a contrast of an image within a predetermined AF area of the captured image such that a subject within the AF area is in focus and, only when the determining device determined that an image of the target subject was detected, changes a position of the AF area to a position of an image which was detected by the matching image detection device on the screen showing captured images. This aspect of the invention illustrates a case in which an autofocus device is a device that implements autofocus according to a contrast system.

According to the autofocus system of this invention, erroneous detection of a target subject by an automatic tracking function can be adequately prevented.

DETAILED DESCRIPTION OF THE INVENTION

Hereunder, embodiments of the autofocus system of this invention are described in detail in accordance with the attached drawings.

Figure 1:
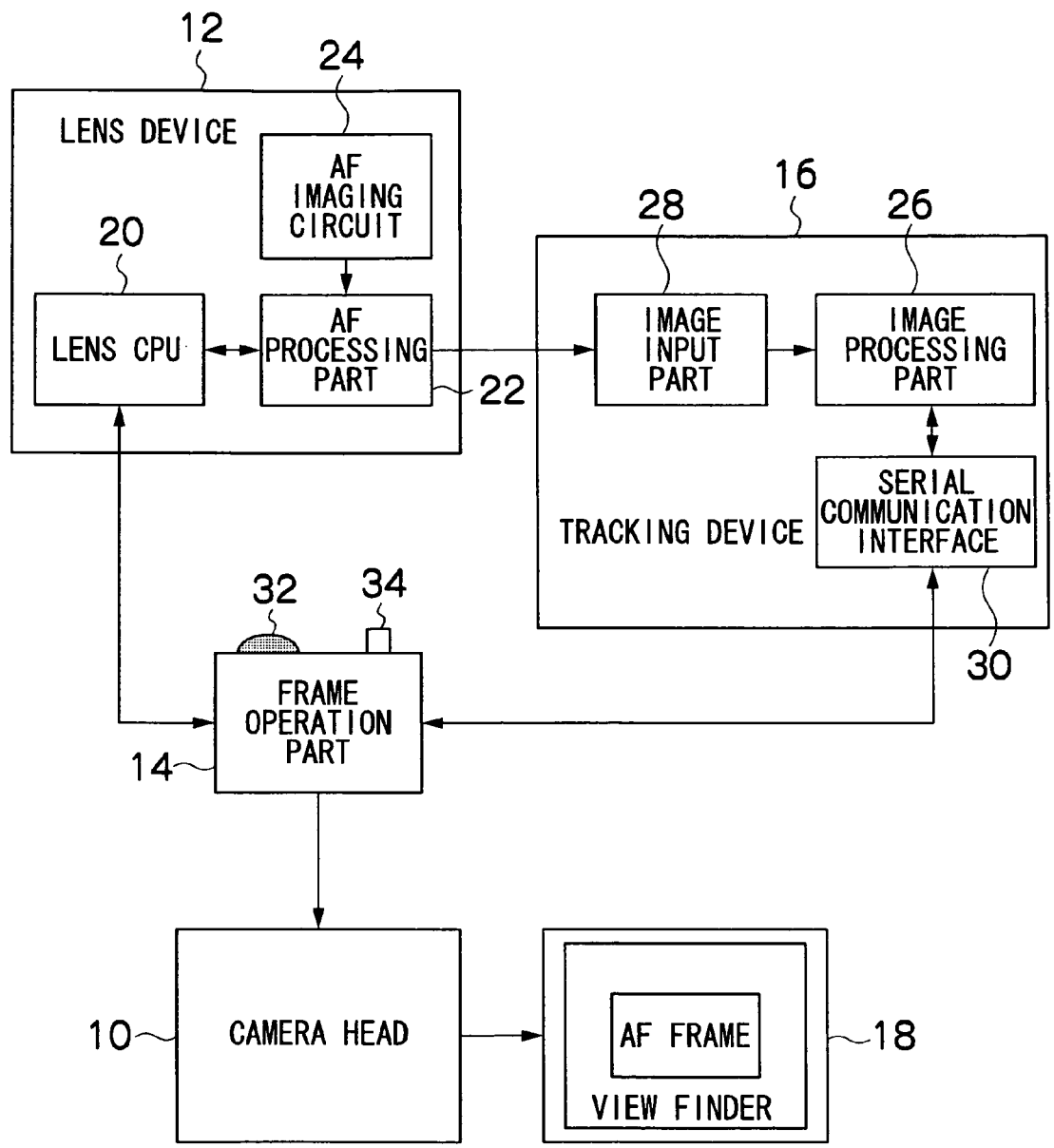
FIG. 1 is a block diagram illustrating the overall configuration of an imaging system which applies the autofocus system of this invention.

FIG. 1 is a block diagram illustrating the overall configuration of an imaging system which applies the autofocus system of this invention. The imaging system shown in the figure is, for example, an imaging system used in imaging by a television camera for broadcasting. The figure shows a camera head 10 for which it is possible to exchange lenses, a lens device 12 which is equipped with a taking lens (optical system) that is mounted in a lens mount of the camera head 10, a frame operation part 14, and a tracking device 16 and the like.

On the camera head 10 is mounted an image pickup device (for example, a CCD) and a required signal processing circuit or the like. An image formed by the taking lens of the lens device 12 undergoes photoelectric conversion by the image pickup device and is then subjected to required signal processing by the signal processing circuit. A video signal of a predetermined format that is generated by the signal processing circuit is output to an external device from a video signal output terminal or the like of the camera head 10. A view finder (monitor) 18 for confirming the image composition or the like is provided on the camera head 10. A video signal from the camera head 10 is supplied to the view finder 18 such that a real time image (video image) which is being imaged by the camera head 10 is displayed on the screen of the view finder 18. Further, information of the AF area as the autofocus (AF) target region, for example, an AF frame, is also displayed on the screen of the view finder 18.

The lens device 12 comprises a taking lens (optical system) (not shown) that is mounted on the lens mount of the camera head 10. The image of a subject is formed on an imaging surface of the image pickup device of the camera head 10 by the taking lens. In the taking lens, a focus lens group, a zoom lens group and moving parts for adjusting imaging conditions such as an aperture and the like are provided as components thereof. These moving parts are electrically driven by a motor (servo mechanism) (not shown). For example, the focus lens group or the zoom lens group moves in the direction of the optical axis, and focus (subject distance) adjustment is performed by movement of the focus lens group and focal distance (zoom magnification) adjustment is performed by movement of the zoom lens group. In this connection, in a system relating to autofocus such as that described in the present embodiment, it is sufficient that at least the focus lens group can be driven electrically, and the configuration may be one in which the other moving parts can only be driven manually. When electrically driving a predetermined moving part in accordance with an operation of the operator, the operation of the moving part is controlled on the basis of a control signal output from an operation part (operation part of a controller connected to the lens device 12 or the like) (not shown) in accordance with the operation of the operator, however a detailed description thereof is omitted herein.

As shown in FIG. 1, on the lens device 12 are mounted a lens CPU 20 that carries out centralized control of the entire lens device 12, an AF processing part 22 that executes autofocus (AF) processing, an AF imaging circuit 24 and the like. The AF imaging circuit 24 is disposed in the lens device 12 to acquire a video signal for AF processing, and it comprises an image pickup device (CCD or the like) and a processing circuit that outputs an output signal of the image pickup device as a video signal in a predetermined format or the like. In this connection, the image pickup device of the AF imaging circuit 24 is referred to as an "AF image pickup device". Further, it is assumed that a video signal output from the AF imaging circuit 24 is a luminance signal.

An image of a subject light that branched from a subject light incident on the image pickup device of the camera head 10 is formed on the imaging surface of the AF image pickup device by a half mirror or the like disposed in the optical path of the taking lens. The configuration is such that an imaging region and a subject distance (distance to the subject that is in focus) with respect to the imaging area of the AF image pickup device match an imaging region and a subject distance with respect to the imaging area of the image pickup device of the camera head 10, and a captured image that is introduced by the AF image pickup device matches a captured image that is introduced by the image pickup device of the camera head 10. In this connection, it is not necessary that both of these imaging regions match completely and, for example, the imaging region of the AF image pickup device may be a large region that contains the imaging region of the image pickup device of the camera head 10. A configuration may also be adopted whereby a video signal from the camera head 10 is sent to the AF processing part 22 without providing an AF image pickup device.

The AF processing part 22 acquires a video signal from the AF imaging circuit 24 and calculates a focus evaluation value indicating variations in the contrast of the subject image based on the video signal. For example, after extracting the signals of high-frequency components of a video signal obtained from the AF image pickup device using a high pass filter, the signals of a region corresponding to an AF area as an AF object region among the signals of the high-frequency components are integrated by adding the amounts for each single screen. The integrated value obtained in this manner for each single screen indicates the variations in the contrast of the subject image and is supplied to the lens CPU 20 as a focus evaluation value. In this connection, the region of the AF area is specified by the lens CPU 20 as described later.

As described in detail later, the lens CPU 20 acquires information of an AF frame (AF frame information) that indicates the region (edges) of the AF area from the frame operation part 14, and specifies a region inside the AF frame that was specified by that AF frame information as the AF area in the AF processing part 22. The lens CPU 20 then acquires from the AF processing part 22 a focus evaluation value determined from an image (video signal) within that AF area and also controls the focus lens group such that the obtained focus evaluation value is the largest (maximum) value, that is, such that the contrast of the subject image of the AF area is at a maximum. For example, a hill-climbing method is generally known as a control method for a focus lens group that is based on a focus evaluation value. The hill-climbing method moves a focus lens group in a direction in which the focus evaluation value is increasing, and when a point at which the focus evaluation value starts to decrease is detected, it sets the focus lens group at that position. Thus, the subject within the AF frame is brought into focus automatically.

Figure 2:
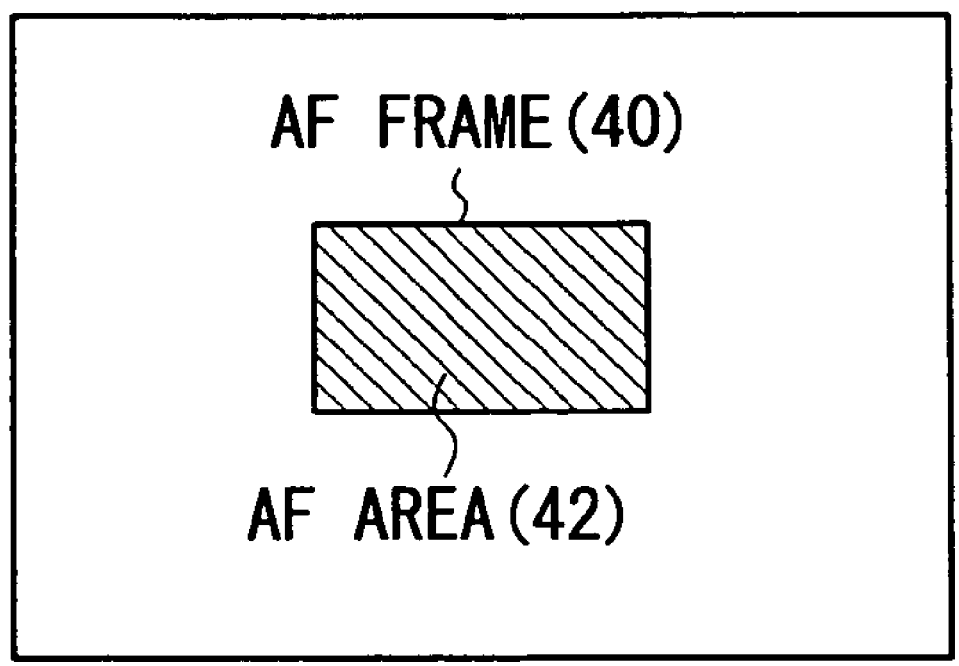
FIG. 2 is a view exemplifying an AF frame.

The frame operation part 14 comprises an operation member to enable the operator to specify setting details of the AF frame, such as the position, size and shape of the AF frame. An AF frame 40 shown in FIG. 2 shows the edges of an AF area 42 that is the AF object region with respect to a (screen of a) captured image or an imaging region of the image pickup device of the camera head 10. When the operation member is operated by an operator, the frame operation part 14 sets or changes the setting details of the position of the AF frame or the like in accordance with that operation. In this connection, in this embodiment a description regarding changing the size or shape of the AF frame is omitted and it is assumed that the aspect ratio is set to a rectangular shape of a fixed and predetermined size unless specifically indicated otherwise. Further, changes to the setting details such as the position of the AF frame by the operation member of the frame operation part 14 are based on the setting details of the AF frame before the operation, and are carried out by changing the setting details by only the amount of change that corresponds to the operation amount of the operation member thereafter. For example, the position of the AF frame only moves in the direction and by the movement amount that correspond to the rotational direction and rotational amount of the track ball 32.

Further, when a point that determines the position of the AF frame (in this embodiment, the centre position of a rectangular AF frame) inside an imaging region (screen showing a captured image) is taken as an AF point, the position of the AF frame is determined by setting the position of the AF point.

In contrast, in a state in which the operation member of the frame operation part 14 is not operated and the operator does not specify a change to the setting details of the AF frame, the setting details of the AF frame are set or changed by AF frame information supplied from the tracking device 16. In accordance with a request from the lens CPU 20, the frame operation part 14 sends AF frame information showing the setting details of an AF frame that was set or changed by an operation of the operator or AF frame information from the tracking device 16 to the lens CPU 20. As a result, the AF object region is set to the region of the AF frame that was set or changed by the frame operation part 14.

In this connection, the tracking device 16 is a device for implementing an automatic tracking function that, while detecting an image of an object (target subject) specified by the operator on a screen showing a captured image, automatically changes (automatically tracks) the position of the AF area (AF frame) in line with the movement of the image of that object. When a manual operation to change the AF frame is not being performed by the operator, automatic tracking of the AF frame is performed by the tracking device 16, and when a manual operation to change the AF frame is performed by the operator, that manual operation is given priority over the tracking device 16 so that the AF frame is changed in accordance with the manual operation of the operator. It is also possible to turn off the automatic tracking function to enable only manual operation.

The frame operation part 14 also sends AF frame information showing setting details of the AF frame that was set or changed as described above to the camera head 10, and displays that AF frame in a corresponding position on the screen of the view finder 18. As a result, while viewing the view finder 18 the operator can recognize the position of the AF frame and the like at that time.

Furthermore, as described later herein, in order to allow the AF frame to track a desired object, the tracking device 16 stores an image of that object as a reference pattern image and performs processing that detects the position of the object on a screen showing a captured image using pattern matching processing. Assuming that the degree of matching for determining that an image was detected that matches the reference pattern image (the image of the object was detected) within a captured image in the pattern matching processing is referred to as the "pattern matching sensitivity" (or simply "sensitivity"), a sensitivity adjustment knob 34 for manually adjusting the pattern matching sensitivity is provided on the frame operation part 14. The pattern matching sensitivity that was set on the basis of the setting position of the sensitivity adjustment knob 34 is sent as sensitivity information to the tracking device 16 from the frame operation part 14.

Figure 3:
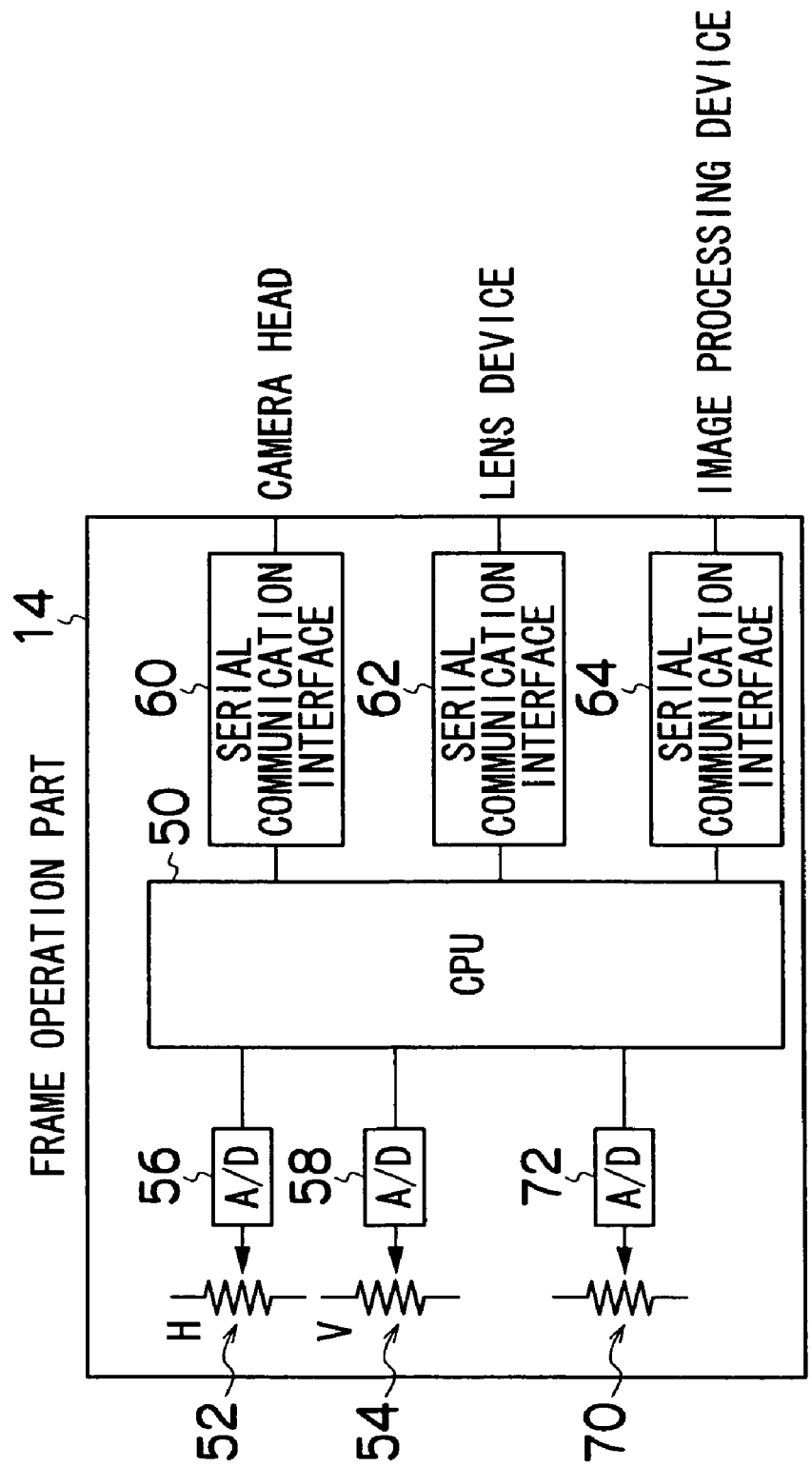
FIG. 3 is a configuration diagram illustrating the internal configuration of a frame operation part.

FIG. 3 is a configuration diagram illustrating the internal configuration of the frame operation part 14. As shown in the figure, the frame operation part 14 is provided with a CPU 50 and serial communication interfaces 60, 62 and 64 for sending and receiving various information to and from the camera head 10, the lens device 12 and the tracking device 16, respectively. The frame operation part 14 also comprises position sensors 52 and 54 that detect the rotational position in the horizontal direction and the vertical direction of the track ball 32 (see FIG. 1) that controls the position of the AF frame, and A/D converters 56 and 58 that perform A/D conversion of output voltage of the respective position sensors 52 and 54 and input the converted output to the CPU 50. The CPU 50 detects the operation of the track ball 32 based on signal values input from the respective position sensors 52 and 54.

The frame operation part 14 further comprises a volume 70 that moves in response to movement of the sensitivity adjustment knob 34, and an A/D converter 72 that performs A/D conversion of output voltage of the volume 70 and inputs the converted output to the CPU 50. The CPU 50 sets the pattern matching sensitivity on the basis of a signal value input from the volume 70 and sends it as sensitivity information to the tracking device 16.

The tracking device 16 comprises an image processing part 26, an image input part 28, a serial communication interface 30 and the like. The image input part 28 acquires through the AF processing part 22 a video signal (luminance signal) that was obtained by the aforementioned AF imaging circuit 24, and supplies image data of a captured image obtained from that video signal to the image processing part 26 in response to a request from the image processing part 26.

Based on a captured image acquired from the image input part 28 that is described in detail later, the image processing part 26 detects by pattern matching processing the position of an object on a screen as specified by the operator. Taking that object position as an AF frame position (AF point), the image processing part 26 sends AF frame information showing the AF frame position to the frame operation part 14 through the serial communication interface 30.

The image processing part 26 also sets the pattern matching sensitivity for pattern matching processing based on sensitivity information supplied from the frame operation part 14, and determines whether or not an image that matches the reference pattern image was detected (whether or not an image of the object was detected) in a captured image in the pattern matching processing in accordance with the pattern matching sensitivity.

Figure 4:
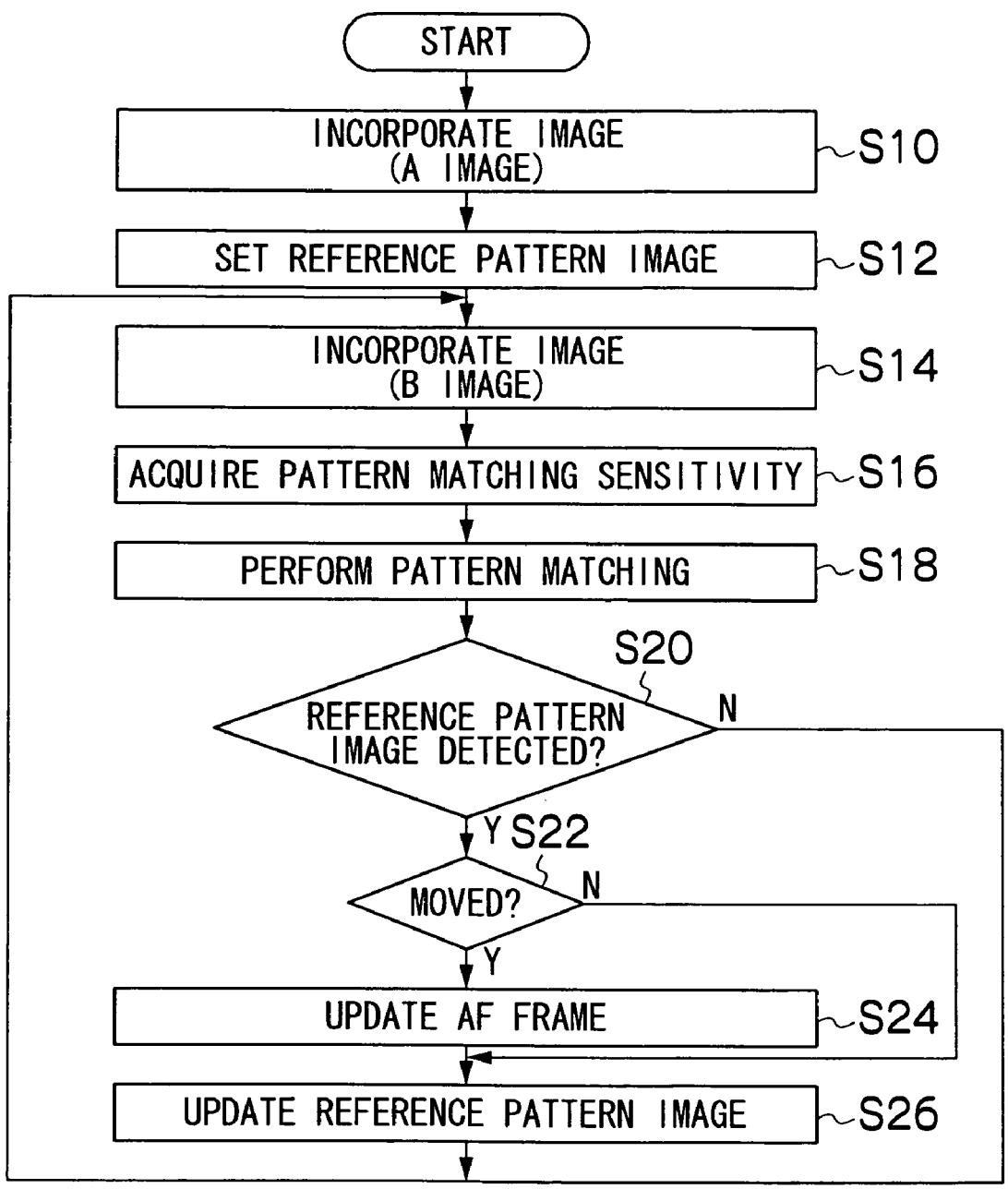
FIG. 4 is a flowchart showing the procedures of tracking processing in a tracking device.

Next, tracking processing by the image processing part 26 in the tracking device 16 is described in detail referring to the flowchart of FIG. 4. First, the operator operates the operation member of the frame operation part 14 while viewing the AF frame and the image displayed on the screen of the view finder 18 to render into the AF frame a part or all of an object that is being tracked as a focus object. As a result, that object is brought into focus by AF processing in the lens CPU 20.

Subsequently, the operator presses an Enter button of the frame operation part 14. Thereby, a reference pattern image setting instruction (instruction to store a reference pattern image) is sent from the frame operation part 14 to the image processing part 26.

When the image processing part 26 receives the instruction to set a reference pattern image, it reads AF frame information showing the setting details of the AF frame at that time from the frame operation part 14 through the serial communication interface 30 and also incorporates a captured image (image data) of the amount of one screen (amount of one frame) from the video signal being supplied to the image input part 28 from the AF processing part 22 of the lens device 12 (step S10). In this connection, the captured image that was incorporated at that time is referred to here as "A image". Further, assuming that the video signal supplied to the image input part 28 from the AF processing part 22 is, for example, a video signal according to an interlace system in which a captured image for one screen (one frame amount) is constituted by a video signal for two fields, a captured image that is incorporated as the amount of one screen from the image input part 28 may be a captured image obtained based on a video signal for one field or may be a captured image obtained based on a video signal for two fields. In this specification, in a case where a captured image for one screen is taken as a captured image obtained based on a video signal for one field or a video signal for two fields in an interlace system, or even in a case in which it is taken as a captured image obtained based on a video signal for one frame in a non-interlace system, one screen is referred to as "one frame."

Next, as the region of a reference pattern frame, the image processing part 26 extracts from the A image captured in step S110 the image within a region of the A image that is slightly smaller than the AF frame specified by the aforementioned AF frame information and sets (stores) the image as the reference pattern image (step S12).

In this case, the reference pattern image is image data used in pattern matching processing that is described later and a reference pattern frame when setting the initial reference pattern image may be, for example, the same region as the AF frame, or the reference pattern frame may be set by an operator setting the region of the AF frame such that a suitable region (position, size and shape of region) is taken as the capture region for the reference pattern image. In this case, the AF frame as an AF object region may be reset to a suitable region after setting of the reference pattern image is completed. A configuration may also be adopted whereby the reference pattern frame and AF frame are changed in a state in which they were continuously matching. Further, a configuration may be adopted whereby in addition to displaying the reference pattern frame in the view finder 18 separately to the AF frame, the region of the reference pattern frame can be set separately to the AF frame by an operation of the operator.

When setting of the reference pattern image in step S12 is completed the image processing part 26 repeats the processing of the following steps S14 to S26. First, it newly incorporates a captured image for one screen from the image input part 28 (step S14). The captured image acquired in step S14 is referred to as "B image."

Next, the image processing part 26 acquires the pattern matching sensitivity for the pattern matching processing set by the sensitivity adjustment knob 34 of the frame operation part 14 from the sensitivity information supplied from the frame operation part 14 (step S16). The image processing part 26 then executes a known pattern matching processing for detecting the region (position) of an image that most matches the stored reference pattern image within the screen region of B image (step S18).

For example, when detecting the position of an image that most matches the reference pattern image using normalized correlation pattern matching, the following operation for a correlation value (correlation coefficient) r is performed.

Assuming that g represents the pixel value of the reference pattern image, f represents the pixel value of a region of interest extracted from B image in order to determine the correlation value r of the reference pattern image, ($\Sigma g$) and ($\Sigma f$) represent the total sum of the pixel value (luminance value) of each pixel inside the respective regions, ($\Sigma g^2$) and ($\Sigma f^2$) represent the sum of squares of the pixel value for each pixel, ($\Sigma fg$) represents the total sum of the product of the pixel values of pixels corresponding to the reference pattern image and the image of the region of interest of B image, and n represents the number of pixels of the reference pattern image, then the correlation value r is calculated by the following formula:

$$r^2 = \{n(\Sigma fg) - \Sigma f \Sigma g\}^2 / [\{n\Sigma f^2 - (\Sigma f)^2\}\{n\Sigma g^2 - (\Sigma g)^2\}]$$

By performing the above operation with respect to the image of the region of interest at each position while changing the position of the region of interest inside B image, the correlation value r indicating the correlation between the reference pattern image and the image of the region of interest at each position in B image can be calculated.

The correlation value r takes a value within the range of $0 \leq r \leq 1$, and the higher the degree of matching of an image with the reference pattern image, the closer the correlation value for that image will be to 1. Therefore, the image of a region of interest for which the correlation value r is highest is detected as the image that most matches the reference pattern image. The position (region) of the region of interest at that time is detected as the position of the image that most matches the reference pattern image.

However, when the correlation value that showed the highest value is less than a predetermined threshold value rs, it is not determined that an image matching the reference pattern image was detected, and the image processing part 26 determines that the reference pattern image (target image) was not detected inside B image (image does not exist). The threshold value rs is set on the basis of the pattern matching sensitivity that was acquired in step S16. As the value indicated by the pattern matching sensitivity increases, the value that is set for the threshold value rs will also increase and thus the conditions for determining that the reference pattern image was detected inside B image also become more stringent.

When pattern matching processing is performed in this manner, the image processing part 26 next determines whether or not the reference pattern image (target image) was detected inside B image (whether the target image was detected) (step S20). When the correlation value of the image that most matches the reference pattern image (that is, the correlation value that exhibited the highest value among the above described correlation values r for the image of each region of interest) is equal to or greater than a threshold value rs that was set using the pattern matching sensitivity, the image processing part 26 decides YES in step S20, and when the correlation value is less than the predetermined threshold value the image processing part 26 decides NO in step S20.

When YES was decided in step S20, the image processing part 26 refers to the position of the object detected in step S18 to determine whether or not that object moved on the screen (step S22). When the image processing part 26 decided YES in step S22, it moves the position (AF point) of the AF area in the same direction as the movement direction of the object and by the same amount as the amount be which the object moved. It then sends AF frame information showing the position of that AF area to the frame operation part 14. As a result, the setting details of the AF frame, that is, the position of the AF frame, are updated (step S24). When the position of the AF frame is updated, the AF object region in the lens device 12 and the position of the AF frame displayed on the screen of the view finder 18 are updated in accordance therewith. When the image processing part 26 decided NO in step S22, it does not execute the processing of step S24.

Next, the image processing part 26 incorporates as the reference pattern image the image inside B image that was detected by the pattern matching processing of step S18 as the image that most matches the reference pattern image, whereby the reference pattern image is updated with that image (step S26). The operation then returns to step S14 to repeat the processing from step S14.

In contrast, when the image processing part 26 decided NO in step S20, the operation returns to the processing of step S14 without updating the AF frame position or the reference pattern image as described above, and repeats the processing from step S14.

The above described processing enables an object to be detected in accordance with a pattern matching sensitivity specified by the operator, and it is possible to suitably track an object without erroneous detection by setting the appropriate pattern matching sensitivity in accordance with the imaging conditions.

Although in the above described embodiment a configuration was adopted whereby consecutive values can be set by the sensitivity adjustment knob 34 when manually setting the pattern matching sensitivity, a configuration may also be adopted that enables one of several levels (for example, the three levels low, medium and high) to be set by a switch or the like.

A configuration may also be adopted that automatically switches the pattern matching sensitivity to a suitable value in accordance with the imaging situation or the like.

Further, although the lens device 12, the frame operation part 14 and the tracking device 16 were illustrated as separate devices in the above embodiment, any two of these or all of these may be integrated into one device. In addition, although in the above embodiment an operation member (for example, an Enter switch for deciding an object or the like) relating to processing of the tracking device 16 was provided in the frame operation part 14, a configuration may be adopted in which the operation member is provided in the tracking device 16.

Furthermore, although in the above embodiment a video signal for AF is acquired by an image pickup device dedicated to AF that is separate to the image pickup device of the camera head 10, a video signal may be used that is obtained for AF use by the image pickup device of the camera head 10. However, in a case where a video signal for AF is obtained from an image pickup device dedicated to AF as in the above embodiment, when the camera head 10 is a device that is compatible with a high definition (HD) television system auto focusing can be performed without using that HD signal, which is advantageous with respect to downsizing and power saving.

Although in the above embodiment a case was described in which AF according to a contrast system was employed, this invention can also be applied when AF according to a system other than a contrast system is employed.

What is claimed is:

1. An autofocus system, comprising:
    an imaging device which captures a subject image formed by an optical system;
    a frame operation device that sets an autofocus frame within the captured image, the autofocus frame including an image of a target subject;
    an image processing device that stores the target subject as a reference pattern image;
    a matching image detection device which detects an image that most matches the stored reference pattern image from subsequently captured images captured by the imaging device;
    a determining device that determines that the image of the target subject was detected among the subsequently captured images when a correlation value which indicates a degree of matching of an image detected by the matching image detection device with respect to the reference pattern image is equal to or greater than a predetermined threshold value and determines that an image of the target subject was not detected among the subsequently captured images when the correlation value is less than the threshold value;
    a changing device which changes the threshold value in the determining device;
    an autofocus device which, only in a case where the determining device has determined that an image of the target subject was detected, takes a position, on a screen showing captured images, of an image that was detected by the matching image detection device as a position of the target subject to focus on and performs focus adjustment of the optical system such that a target subject in the position is in focus; and an updating device that updates a position of the autofocus frame based on the position of the image.

2. The autofocus system according to claim 1, wherein the changing device comprises a designating device which designates by a manual operation a value to be set as the threshold value, and a setting device which sets the threshold value to the value designated by the designating device.

3. The autofocus system according to claim 1, wherein the autofocus device performs focus adjustment based on a contrast of an image within the autofocus frame such that a subject within the autofocus frame is in focus and, only when the determining device determined that the image of the target subject was detected, changes a position of the autofocus frame to the position of the image.

4. The autofocus system according to claim 2, wherein the autofocus device performs focus adjustment based on a contrast of an image within the autofocus frame such that a subject within the autofocus frame is in focus and, only when the determining device determined that the image of the target subject was detected, changes a position of the autofocus frame to the position of the image.

5. The autofocus system according to claim 1, wherein the frame operation device comprises a designating device which allows adjustment of the autofocus frame by a manual operation.

6. An autofocus system, comprising:

an imaging device which captures an image formed by an optical system;

a frame operation device that sets an autofocus frame within the captured image, the autofocus frame including an image of a target subject;

an image processing device that stores the target subject as a reference pattern image;

a matching image detection device which detects an image that most matches the stored reference pattern image from subsequently captured images captured by the imaging device;

a determining device that determines that the image of the target subject was detected among the subsequently captured images when a correlation value which indicates a degree of matching of an image detected by the matching image detection device with respect to the reference pattern image is equal to or greater than a predetermined threshold value;

an autofocus device which, only in a case where the determining device has determined that an image of the target subject was detected, takes a position of an image that was detected by the matching image detection device as a position of the target subject to focus on and performs focus adjustment of the optical system such that a target subject in the position is in focus; and an updating device that updates a position of the autofocus frame based on the position of the image.

7. The autofocus system according to claim 6, wherein the frame operation device comprises a designating device which allows adjustment of the autofocus frame by a manual operation.

8. The autofocus system according to claim 6, wherein the updating device updates the position of the autofocus frame to the position of the image.

* * * * *